April 17, 1956 H. WIESENER 2,742,252
WEATHER ROOF
Filed March 20, 1950
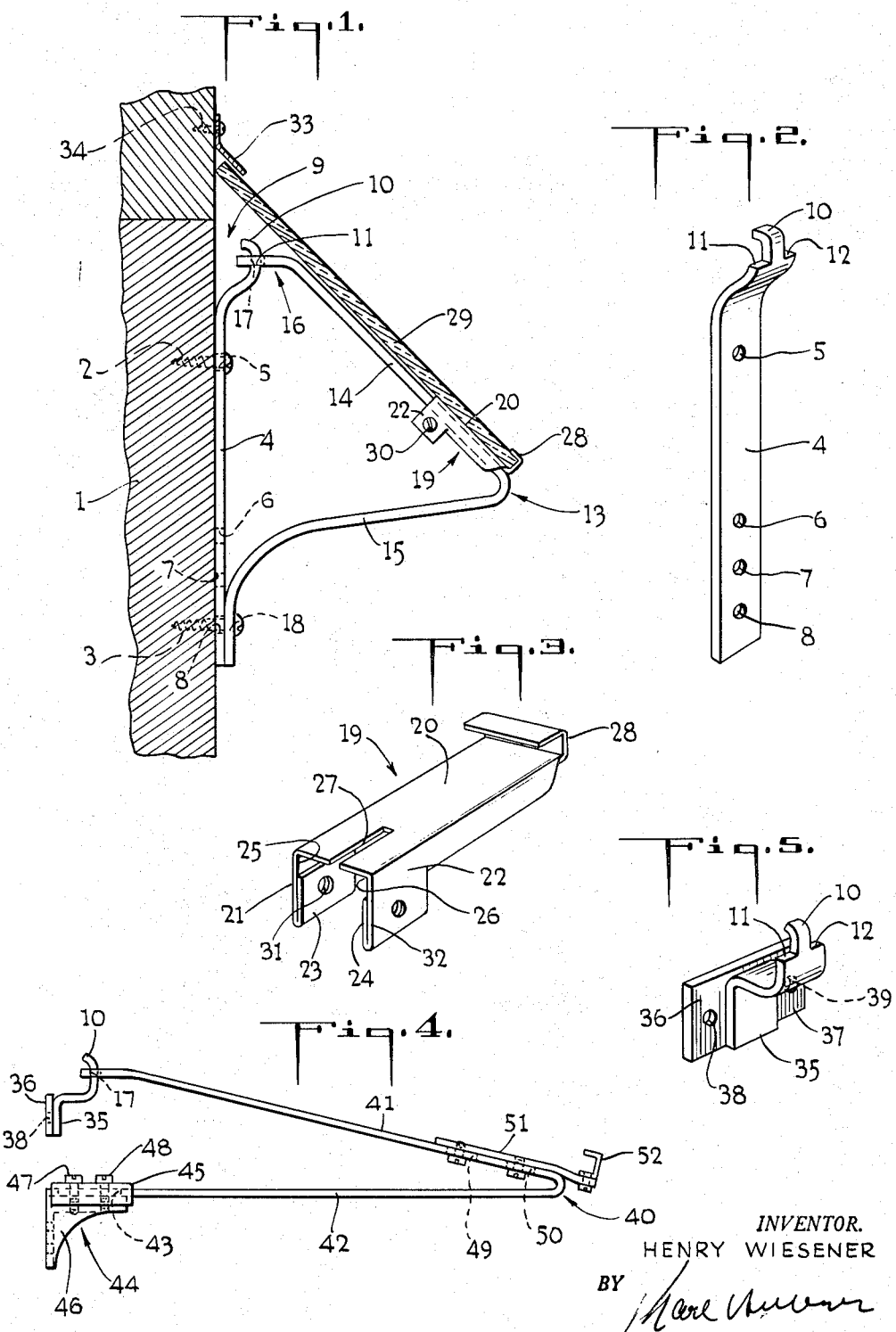
INVENTOR.
HENRY WIESENER
BY
ATTORNEY

United States Patent Office 2,742,252
Patented Apr. 17, 1956

2,742,252
WEATHER ROOF

Henry Wiesener, Irvington, N. J.

Application March 20, 1950, Serial No. 150,703

5 Claims. (Cl. 248—224)

The present invention relates to a weather roof and more particularly to a weather roof including adjustable supporting means therefor.

Weather roofs of the type employed for windows and doorways comprise various structural means for supporting the main roof member. Usually, the main roof member and its supporting structure are assembled as a fixed unit of established dimensions. Such units are not easily adjustable with regard to desired slope of the roof and are not otherwise easily applicable to variations in window or door frame construction. Furthermore, a fixed type of weather roof unit is secured directly to a framework and is not readily removable without marring the framework to which it is secured. For example, in seasonal installation and removal of storm windows and screens it may be necessary to remove the entire weather roof unit, which is not only time consuming but necessitates the removal and replacement of retaining screws into the wood framework which mar the framework or detract from the supporting strength.

It is one object of the present invention to provide a weather roof for windows and doorways including adjustable supporting means therefor. It is another object of the present invention to provide an adjustable bracket for weather roofs. It is a further object of the present invention to provide a weather roof including an adjustable supporting bracket therefor and an adjustable clamp means associated with said supporting bracket. It is a still further object of the present invention to provide an adjustable bracket and an adjustable member associated therewith adapted to provide a common supporting means for various kinds of main roof members in weather roofs for windows and doorways. Other objects and advantages of the present invention will become apparent from the description hereinafter following and the drawings forming part hereof in which:

Fig. 1 illustrates a side view of a window weather roof according to the present invention, Fig. 2 is a perspective view of an embodiment illustrated in Fig. 1, Fig. 3 is a perspective view of another embodiment illustrated in Fig. 1, Fig. 4 illustrates a side view of a modification of the present invention, and Fig. 5 is a perspective view of an embodiment illustrated in Fig. 4.

The window weather roof according to the present invention is associated with the ventilation of a room by lowering the upper window sash whereby ventilation is attained. During inclement weather the roof prevents the entry of rain or snow into the room while the window is open for ventilation.

Regarding doorways, the weather roof protects doors and doorsteps from rain or snow.

The construction of the weather roof of the present invention provides for ease in installation, adjustment of the structural components in accordance with variations in window and door framework, and for adjustment in desired slope of the roof, said adjustments being accomplished with minimum effort and without detracting from the strength of the supporting structure.

Fig. 1 illustrates a window weather roof having its supporting structure secured to an upper portion of a side of the window framework 1 by means, for example, of the retaining screws 2 and 3. The roof supporting structure comprises an elongated metal base member, e. g. base plate 4, provided with a plurality of bores or holes 5, 6, 7 and 8 formed therethrough and spaced along the length thereof and through which the retaining screws secure said base plate to the side of the framework 1. An end portion of the base plate 4 is substantially hook-like and curved or bent so that, when the base plate is secured to the framework, the hook-like portion is spaced from the framework to provide a gap 9 between the framework and the hook terminal. The hooked portion is cut away along its curvature from its terminal to provide a locking prong 10 and seats 11 and 12 substantially midway of its curvature as illustrated by Fig. 2. When the base plate 4 is secured to the side of the framework 1, the prong 10 and seats 11 and 12 are uppermost and above the said screw holes or bores. In combination with said base plate to form a supporting bracket therewith, I provide a substantially V-shaped metal structure 13 preferably formed of flat stock and having a straight slope portion or arm 14 along the major length thereof and an arched portion or arm 15, said arm 15 being arched inwardly of the V-shape apex. An end portion of the arm 14 is preferably bent inwardly of the V-shape apex to form a substantially short platform 16 for resting on the seats 11 and 12. The platform 16 has an opening 17 formed therethrough substantially rectangular and engageable with the prong 10 to form an interlock therewith. Having engaged the prong 10 with the opening 17 with the platform 16 seated on the seats 11 and 12, the terminal portion of the arched arm 15 is secured to the lower portion of the base plate 4 by means, for example, of the screw 3 passing through a bore hole 18 formed through said terminal portion of the arm 15 and through a lowermost hole 8 in the base plate 4 to the side of the framework 1. Having thus secured said V-shaped structure 13 to the base plate 4, a weather roof supporting bracket is formed with a straight roof slope extending downwardly toward the V-shape apex, said roof slope being adjustable merely by removing, for example, the retaining screw from the lowermost hole 8 of the base plate 4 and passing it through an upper hole, i. e. hole 6 or 7. In combination with said roof slope portion of the V-shaped structure, I provide an adjustable elongated clamp member 19 cooperative with and slideable along the plane of the said roof slope portion and particularly illustrated by Fig. 3. The elongated clamp 19 has a substantially U-shaped cross-section and comprises as an integral unit an elongated plate portion 20 and a pair of L-shaped sides 21 and 22 formed perpendicular thereto along the length thereof. The extended portions 23 and 24 of said L-shaped sides are bent inwardly and upon themselves to form a double thickness short of contact with said plate portion and thereby providing internal grooves 25 and 26. The plate portion is provided with a slot 27 through an end portion thereof, said slot being parallel to the grooves 25 and 26, while the other end of said elongated plate portion is provided with a terminal trough 28 across its width, said trough having its channel receptive to an edge of a main roof member 29 positioned on the slope portion 14 and a top surface of the clamp plate portion 20. In clamped position, the grooves 25 and 26 engage the sides of the arm 14, and a locking means, e. g. a locking bolt passing through the bores 31 and 32, of which one bore is a threaded bore, in the doubled thickness portions 23 and 24, causes the clamp 19 to maintain any desired position on the arm 14. The locking force applied to said clamp by said locking means immobilizes said clamp by the fact that the slot 27 imparts a resiliency to the slotted portion of the plate 20 and thereby allowing a firm grip between the clamp and the sides of the slope arm 14. The main roof member 29 may be a rectangular plate or sheet of metal, plastic material, or glass, etc., but preferably glass since the benefits of daylight are thereby retained, and need not conform to exact specifications because of the adjustable nature of the clamp 19 which compensates especially for differences in width. It is apparent that at least two of the above described supporting structures spaced laterally of each other, e. g. one on each side of a window framework, are necessary to support the main roof element 29. The top portion of a window framework is provided with a molding, e. g. a quarter round or right angle wood molding, or a metal flashing 33 overlapping the edge of the main roof element 29 along the length thereof, said flashing 33 being screwed to the framework by means, for example, of screws 34. When the main roof element is positioned firmly against the flashing 33, the clamp 19 is forced upwardly along the slope arm 14 and screw 30 tightened so that the main roof element is completely installed.

Fig. 4 illustrates a modification of the present invention applicable particularly to doorways. In the modification, a substantially short base plate 35, identical with the hook-like end portion of the base plate 4 above described, and is provided with flanges 36 and 37 extending sidewardly therefrom, said flanges having bores 38 and 39 formed therethrough and through which a retaining means fastens the base plate to an upper portion of the side of a door frame. A substantially V-shaped metal structure 40, having a slope arm 41 shaped identical with the slope arm 14 above described, engages the base plate 35 similarly as described with regard to Fig. 1. The other arm 42 of the V-shaped structure 40 is a straight arm and is horizontally positioned when the V-shaped structure engages the base plate 35. An end portion of the horizontal arm 42 is provided with a slot 43 parallel to the sides of said arm and with an adjustable retaining bracket 44 comprising a U-shaped upper member 45 and a lower shoe or retaining member 46. The U-shaped member 45 is positioned over the slot 43 in the arm 42 and the lower retaining member is positioned on the underside of slot 43, said upper and lower members being slideably secured to the arm 42 by a retaining means, for example, two bolts 47 and 48, which pass through the slot 43 and secure the upper member 45 in fixed relation to the lower member 46, said bolts being movable within said slot along the length thereof and thereby imparting adjustability to said retaining bracket. Having secured the above described supporting bracket to the both sides of a door frame, the V-shaped structure may be easily disengaged by simply removing the bolts 47 and 48, and leaving the base plate 35 and the lower retaining bracket member 46 secured to the framework. Although the adjustable clamp 19 may be utilized with the doorway supporting structure, a sturdier clamp may be desired. In such case the thickness of the metal would prevent the formation of the clamp 19 and I, therefore, provide the arm 41 with a slot or preferably two elongated slots 49 and 50 spaced from each other along the length of the arm 41 and formed through a portion of the arm 41 parallel thereto and in the vicinity of the V-shape apex and through each of which slots a bolt or other retaining means slideably secure an elongated clamp plate 51 having a terminal trough 52 receptive to an edge of a main roof member as described according to Fig. 1.

It is apparent from the disclosure hereinbefore set forth, that the construction of the weather roof of the present invention provides for ease of installation, adjustment of the structural components in accordance with variations in window and door framework, adjustment for desired slope of the roof and for the use of various types of main roof members.

What I claim is:

1. A weather roof bracket comprising in combination an elongated vertically disposed base member attachable to a framework and a substantially V-shaped structure engageable with said base member to form said bracket, said base member having a plurality of bores formed therethrough and spaced along the length thereof and a curved hook-like end portion spaced from said framework and cut away along its curvature from its terminal to provide a terminal prong and a seat substantially midway of said curvature, said V-shaped structure having a substantially straight arm and an arched arm, said straight arm having an end portion bent inwardly to form a short platform, said platform having a substantially rectangular opening engageable with said prong to form a seated interlock therewith, said curved arm being arched inwardly and having an end portion secured to said base plate by a retaining means passing through one of said spaced bores, an adjustable clamp member cooperative with and longitudinally slideable along said straight arm of said V-shaped structure.

2. A weather roof bracket according to claim 1, wherein said clamp member has a substantially U-shaped cross section and comprises as an integral unit an elongated plate portion and a pair of L-shaped sides formed perpendicular thereto along the length thereof said sides having extended portions bent inwardly and upon themselves to form a double thickness short of contact with said plate portion to provide internal grooves engageable with the sides of said straight arm, said plate portion having a slot through an end portion thereof parallel to each of said portions bent inwardly and upon themselves and said extended portions each having a bore formed therethrough, one of said bores being a threaded bore, threaded locking means passing through said bores for immobilizing said clamp, a terminal trough across the width of an end of said plate portion.

3. A weather roof bracket comprising in combination a short base member attachable to a framework and a substantially V-shaped structure engageable with said base member to form said bracket, said base member having a curved hook-like end portion spaced from said framework and cut away along its curvature from its terminal to provide a terminal prong and a seat substantially midway of said curvature, said base member having flanges extending sidewardly therefrom, said V-shaped structure having upper and lower arms, said upper arm being downwardly sloping arm having an end portion bent inwardly to form a short platform, said platform having a substantially rectangular opening engageable with prong to form a seated interlock therewith, said lower arm being a horizontal arm having a slot formed through an end portion thereof and parallel to its sides, an adjustable retaining bracket cooperative with said slot, said retaining bracket comprising a U-shaped upper member and a lower retaining member with said slotted portion of said horizontal arm positioned therebetween, said upper and lower members being secured in fixed relation by a retaining means passing through said slot, said retaining means being movable within said slot along the length thereof, thereby imparting adjustability to said retaining bracket, an adjustable clamp member cooperative with and slidable along the plane of said upper arm.

4. A weather roof bracket according to claim 3, wherein said upper arm contains a pair of elongated slots parallel to the sides of said arm and spaced from each other along the length of said arm in the vicinity of the V-shaped apex, said clamp member comprising an elongated plate having a terminal trough across the width of an end thereof, a retaining means passing through each of said slots and slidably retaining said plate to said arm, said retaining means being movable within said slots along the lengths thereof.

5. A weather roof bracket comprising in combination a base member attachable to a frame work and a substantially V-shaped structure having upper and lower arms engageable with said base member to form said bracket, said base member having a curved hook-like portion spaced from said framework, and cut away along its curvature from its terminal to provide a terminal prong and a seat substantially mid-way of said curvature, an upper arm of said V-shaped structure being a downwardly sloping arm and having an end portion bent inwardly to form a short platform, said platform having an aperture formed therethrough, said prong being insertable into said aperture to form a seated interlock therewith, an end portion of the lower arm of said V-shaped structure being secured to said framework means for securing said end portion to said framework, an adjustable clamp member positioned on said upper arm.

References Cited in the file of this patent
UNITED STATES PATENTS

| | | |
|---|---|---|
| 586,223 | Basquin | July 13, 1897 |
| 1,452,599 | Hames | Apr. 24, 1923 |
| 1,524,237 | Grammas | Jan. 27, 1925 |
| 1,658,809 | Lackey | Feb. 14, 1928 |
| 1,668,170 | Plym | May 1, 1928 |
| 2,133,113 | Pratt | Oct. 11, 1938 |
| 2,420,297 | Bishop | May 13, 1947 |